Feb. 18, 1969 E. O. RESSLER 3,428,831
ZENER-DIODE BOX CAR SWITCH WITH RESISTIVE DIVIDERS FOR BALANCED CIRCUIT OPERATION
Filed Oct. 22, 1965
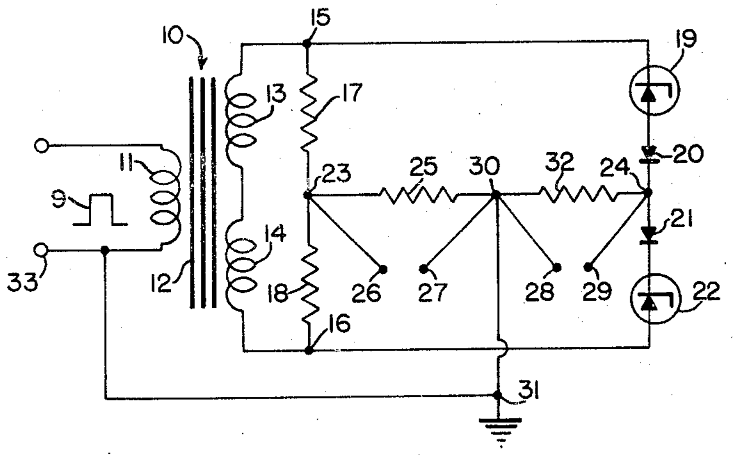
INVENTOR.
ERHARD O. RESSLER
BY Alden D. Redfield
Charles M. Hogan
ATTORNEYS.

United States Patent Office 3,428,831

Patented Feb. 18, 1969

3,428,831

ZENER-DIODE BOX CAR SWITCH WITH RESISTIVE DIVIDERS FOR BALANCED CIRCUIT OPERATION

Erhard O. Ressler, West Chester, Ohio, assignor to Avco Corporation, Cincinnati, Ohio, a corporation of Delaware Filed Oct. 22, 1965, Ser. No. 501,188

U.S. Cl. 307—257 1 Claim

Int. Cl. H03k *17/62*

ABSTRACT OF THE DISCLOSURE

This is a bidirectional gate circuit of the type enabled by a control circuit. A first resistive divider provides control signal input terminals across which is connected the secondary of an input transformer. The center of the first resistive divider is a null point. Between the input terminals and a second null point are connected series pairs of elements, each pair comprising a Zener breakdown diode and a blocking diode. A second resistive divider with a grounded center tap is connected between the null points. The second resistive divider comprises two resistors of which either one may serve as the data input and the other as the data output. The values of the two resistors in the first divider are equal and are proportioned to neutralize inequality of the breakdown voltages of the Zener breakdown diodes.

*Background of the invention*

The present invention is an improvement in box car switching circuits of the type illustrated by FIG. 2 in an article by Paul E. Harris, entitled "Radar Boxcar Circuits Using Nuvistors, Transistors and Zeners," Electronics magazine, Sept. 15, 1961 issue, McGraw-Hill, New York, this circuit being hereinafter referred to as the Harris circuit.

In the following description signals which are passed by the gate are referred to as "data signals" and those which control the gate are referred to as "signal pulses" or "control signals."

The principal object of the invention is to provide an improved gate circuit employing resistive dividers for the purpose of balanced circuit operation. In the fulfillment of this object a first resistive divider is connected across the secondary of the input transformer and a second resisitive divider is connected between the null points. The resistors in the first divider are equal and are proportioned to neutralize inequality of the breakdown voltages of the Zener breakdown diodes.

*Description of the drawing*

For a better understanding of the present invention, together with other and further objects, advantages, and capabilities thereof, reference is made to the following description of the accompanying drawing, which is a circuit schematic of a representative bidirectional transmission gate in accordance with the invention, as actually reduced to practice.

In the single figure of the drawing there is shown a preferred embodiment of the invention in which the gate pulse (also commonly referred to as a control pulse, selector pulse, or enabling pulse) indicated by the reference numeral 9 is applied to the transmission gate inductively—that is, by a transformer 10 having a primary 11, an iron core 12, and a secondary having portions 13 and 14 brought out to terminals 15 and 16. This gate is an improvement in the general category of circuits popularly known as bidirectional diode gates. The arrangement is symmetrical or bridge-like, and the terminals 15 and 16 constitute the gate signal input to this bridge. Between terminals 15 and 16 is disposed one arm of the bridge, which comprises the series combination of resistors 17 and 18. Also between the terminals 15 and 16, constituting corners of the bridge, there are disposed, in series, breakdown diode 19, blocking diode 20, blocking diode 21, and breakdown diode 22. Note that a gating pulse of positive polarity makes the terminals 15 and 16 positive and negative, respectively, and the diodes 20 and 21 are accordingly so poled that they permit reverse current to flow through the Zener breakdown diodes 19 and 22.

The cathode of breakdown diode 19 is adjacent terminal 15, electrically speaking. The anode of breakdown diode 22 is adjacent terminal 16. Adjacent terminal 24 are the cathode of blocking diode 20 and the anode of blocking diode 21. The discussion is on the footing that the control pulse is of positive polarity so far as the input terminals 15 and 16 are concerned. By reason of the provision of the series pairs of elements 19, 20 and 22, 21, biasing sources such as resistance-capacitance networks are eliminated.

The remaining corners of the bridge, which are the zero potential corners, comprise terminals 23 and 24. Since the junction point 23 of the voltage divider 17 and 18 is at zero potential, and since the junction point 24 of the diodes 20 and 21 is also at zero potential, balance is assured at both input terminals 26–27 and output terminals 28–29. The output is free of pedestal, and the control pulse causes no current to flow through the signal source impedance comprising resistor 25 and any input load in shunt therewith. The signal input—i.e., the signal to be gated or transmitted—is applied to terminals 26 and 27 and appears across resistor 25. The signal as gated appears across resistor 32. It will be understood that the series combination of the input resistor 25 and the output resistor 32 is connected between the nodal points 23 and 24, which are nodal so far as the control signal is concerned. The junction of the resistors 25 and 32 is grounded at 31, as is likewise the low potential side 33 of the primary of transformer 10.

Described from another point of view, the element 10 is a pulse transformer. The secondary winding 13, 14 is shunted by a divider network. One branch consists of resistors 17 and 18, connected in series, and a parallel branch consists of avalanche breakdown diodes 19 and 22 in series connection with blocking diodes 20 and 21. Resistors 25 and 32 in series are connected from the midpoint 23 between resistors 17 and 18 to the midpoint 24 between diodes 20 and 21. The midpoint 30 between resistors 25 and 32 is grounded at 31. Input may be applied across resistor 25 with output extracted across resistor 32, and vice versa. This circuit operates bilaterally to gate signals in either direction. Resistor 25 is chosen as the input resistor for purposes of discussion.

Operation proceeds in this manner: a rectangular pulse 9 or other suitable waveform is applied to the primary winding 11 of pulse transformer 10. The voltage induced in the secondary winding 13, 14 of transformer 10 causes a proportionate current to flow through the series combination of avalanche breakdown diodes 19 and 22 and blocking diodes 20 and 21. If a signal is present at signal source impedance 25, it will appear across output impedance 32 for the duration of sampling pulse 9. Magnitudes of divider resistors 17 and 18 are chosen to neutralize eventual inequality of breakdown voltages of avalanche breakdown diodes 19 and 22. Their values are typically about 110 ohms. This shunt branch divider network 17, 18 insures balanced operation of the sampling circuit and prevents direct feedthrough sampling pulse 9 into output impedance 32. The selected low-capacitance diodes 20 and 21, and the inherent low capacitance of avalanche breakdown diodes 19 and 22 at breakdown voltage, insure operation of this gating circuit at high frequencies and very short sampling or control-pulse periods. Diodes 19 and 22 will turn on into avalanche breakdown in less than 50 nanoseconds typically. Their breakdown voltage is selected to suit the particular application. Typical values for the circuit here shown vary from about 6 to 12 volts. The absence of charging capacitors, common to transmission gates, makes this circuit particularly advantageous for nonrepetitive sampling operations.

Typical parameters for the illustrative embodiment described and used in a sampling system are:

| | |
|---|---|
| Resistors **17** and **18** | Each 110 ohms. |
| Signal source impedance **25** | 1500 ohms. |
| Load impedance **32** | 1500 ohms. |
| Zener diodes **19** and **22** | Type 1N960. |
| Blocking diodes **20** and **21** | Type 1N914. |
| Sampling pulse **9** input | Approximately 20 volts peak magnitude and 0.7 microsecond duration at a repetition rate of 100 kilocycles per second. |

A circuit employing these exemplary parameters was found to operate very satisfactorily. A sine wave may be addressed to the signal input 25 in the particular embodiment herein described, and the sampled output is extracted at load impedance 32. The output pulse samples have the same rise time and duration as the input sampling pulse 9. This pulse rise time is typically 150 nanoseconds. The output pulse sample amplitude is analogous to the signal source input signal amplitude. Sampling times of 100 nanoseconds or less are possible with very fast sampling pulses and pulse transformers.

Thus it will be seen that the invention provides a bidirectional gate circuit of the type adapted to be enabled by a control signal (9) to translate data signals from input (26, 27) to output (28, 29) composing:

A first branch circuit comprising first and second impedances (17, 18) connected in series to form a first junction (23) and control signal input terminals (15 and 16);

A second branch circuit comprising a first series pair of a first Zener breakdown diode (19) and a first blocking diode (20), and a second series pair of a second Zener breakdown diode (22) and a second blocking diode (21), said first and second series pairs being connected in series between said control signal input terminals and providing a second junction (24);

A third impedance (25) between said first junction and a point of reference potential (31);

And a fourth impedance (32) between said second junction and said point of reference potential;

One (25) of said third and fourth impedances constituting the input impedance to which are applied the data signals, and the other (32) of said third and fourth impedances comprising the output impedance on which the data signals appear when the gate circuit is enabled by said control signal as applied to said input terminals.

While there has been shown and described what is at present considered to be the preferred embodiment of the invention, it will be understood by those skilled in the art that various modifications and changes may be made therein without departing from the scope of the invention as defined by the appended claim.

I claim:

1. A bidirectional gate circuit of the type adapted to be enabled by a control signal to translate data signals from input to output, comprising:
   - a first branch circuit comprising first and second resistors, connected in series to form a first junction, and control signal input terminals;
   - means for applying the control signal to said input terminals comprising a transformer having a primary including a grounded low potential lead and a secondary connected to said input terminals;
   - a second branch circuit comprising a first series pair of a first Zener breakdown diodes and a first blocking diode, and a second series pairs of a second Zener breakdown diode and a second blocking diode, said first and second series pairs being connected in series between said control signal input terminals and providing a second junction,
   - the values of the first and second resistors being equal and proportioned to neutralize inequality of the breakdown voltages of said Zener breakdown diodes,
   - a third resistor between said first junction and a grounded point of reference potential;
   - and a fourth resistor between said second junction and said grounded point of reference potential;
   - the values of the third and fourth resistors being equal;
   - one of said third and fourth resistors constituting the input resistor to which are applied data signals, and the other of said third and fourth resistors comprising the output resistor on which the data signals appear when the gate circuit is enabled by said control signal as applied to said input terminals;
   - said third and fourth resistors being connected between the null points of a bridge formed by said first and second resistors as one branch and said first and second pairs as the other branch.

References Cited

UNITED STATES PATENTS

| | | | |
|---|---|---|---|
| 3,179,817 | 4/1965 | Bounsall | 307—257 X |
| 3,248,559 | 4/1966 | Azar | 307—257 X |

OTHER REFERENCES

Harris, "Radar Boxcar Circuits . . .", Electronics (mag.), September 1961, (pp. 66, 67 relied on).

Millman et al. Pulse and Digital Circuits (text), December 1956, (pp. 438 to 440).

ARTHUR GAUSS, *Primary Examiner.*

D. D. FORRER, *Assistant Examiner.*

U.S. Cl. X.R.

307—318